US011171900B1

(12) United States Patent
Kao et al.

(10) Patent No.: US 11,171,900 B1
(45) Date of Patent: Nov. 9, 2021

(54) TECHNIQUES FOR MEDIA ENDPOINT CONFIGURATION

(71) Applicant: WhatsApp Inc., Menlo Park, CA (US)

(72) Inventors: Alan Kao, San Jose, CA (US); Jamshid Mahdavi, San Jose, CA (US); Ehren Andrew Kret, Sunnyvale, CA (US)

(73) Assignee: WHATSAPP LLC, Menlo Park, CA (US)

( * ) Notice: Subject to any disclaimer, the term of this patent is extended or adjusted under 35 U.S.C. 154(b) by 205 days.

(21) Appl. No.: 15/921,020

(22) Filed: Mar. 14, 2018

(51) Int. Cl.
*H04L 12/58* (2006.01)
*H04L 29/06* (2006.01)

(52) U.S. Cl.
CPC .............. *H04L 51/10* (2013.01); *H04L 51/04* (2013.01); *H04L 63/0428* (2013.01); *H04L 67/42* (2013.01)

(58) Field of Classification Search
CPC ......... H04L 51/10; H04L 67/42; H04L 51/04; H04L 63/0428
See application file for complete search history.

(56) References Cited

U.S. PATENT DOCUMENTS

| | | | | |
|---|---|---|---|---|
| 9,495,338 B1* | 11/2016 | Hollis | .................. | H04L 67/2842 |
| 2008/0232371 A1* | 9/2008 | Hildreth | .............. | G06F 21/6218 370/392 |
| 2008/0235592 A1* | 9/2008 | Trauth | .................. | G06F 3/0482 715/733 |
| 2012/0210245 A1* | 8/2012 | McCoy | ................ | H04N 21/485 715/747 |
| 2012/0246279 A1* | 9/2012 | Zang | .................... | H04L 65/4076 709/219 |
| 2013/0036344 A1* | 2/2013 | Ahmed | ............... | G06F 16/9535 715/205 |
| 2013/0282793 A1* | 10/2013 | Swings | ............ | H04N 21/23106 709/203 |
| 2014/0380145 A1* | 12/2014 | Wilsher | ................ | H04L 12/287 715/234 |
| 2016/0050289 A1* | 2/2016 | Cohen | ..................... | H04L 67/30 709/204 |
| 2016/0094653 A1* | 3/2016 | Balasubramanian | ........ | H04L 67/1057 709/217 |
| 2016/0364120 A1* | 12/2016 | Koum | .................. | G06F 3/04845 |
| 2016/0373382 A1* | 12/2016 | Reed | ........................ | H04L 51/32 |
| 2017/0195400 A1* | 7/2017 | Spitz | ........................ | H04L 67/06 |

(Continued)

*Primary Examiner* — Rupal Dharia
*Assistant Examiner* — Adam A Cooney
(74) *Attorney, Agent, or Firm* — Kacvinsky Daisak Bluni PLLC

(57) ABSTRACT

Techniques for media endpoint configuration are described. In one embodiment, an apparatus may comprise a messaging server component operative to receive a media message addressed to a recipient user account, the media message comprising a media identifier for a media item; and send the media message to a recipient client device associated with the recipient user account; and a media management component operative to send a media endpoint list to a recipient client device, the media endpoint list operative to configure the recipient client device to retrieve the media item by identifying the media item with the media identifier to a media endpoint determined based on the media endpoint list. Other embodiments are described and claimed.

20 Claims, 11 Drawing Sheets

(56) References Cited

U.S. PATENT DOCUMENTS

2018/0083899 A1* 3/2018 Sumter .................. G06F 3/013
2018/0262419 A1* 9/2018 Ludin ................ H04L 61/1511
2018/0302457 A1* 10/2018 Hassan .................. H04L 65/80
2018/0367483 A1* 12/2018 Rodriguez ............ H04L 51/046

* cited by examiner

600

```
┌─────────────────────────────────────────────────┐
│  Receive a media message addressed to a recipient user
│  account, the media message comprising a media identifier for
│                    a media item.
│                        602
└─────────────────────────────────────────────────┘
                          │
┌─────────────────────────────────────────────────┐
│  Send the media message to a recipient client device associated
│           with the recipient user account.
│                        604
└─────────────────────────────────────────────────┘
                          │
┌─────────────────────────────────────────────────┐
│  Send a media endpoint list to a recipient client device, the
│  media endpoint list operative to configure the recipient client
│    device to retrieve the media item by identifying the media
│  item with the media identifier to a media endpoint determined
│              based on the media endpoint list.
│                        606
└─────────────────────────────────────────────────┘
```

*FIG. 6*

TECHNIQUES FOR MEDIA ENDPOINT CONFIGURATION

BACKGROUND

Users may interact with each other in a messaging system, sending messages back and forth to each other in a text-based conversation between two or more users. A user may have a user account associated with them in the messaging system. The user account is an online identity for the user and can be used as a destination for messages directed to the user, and generally for coordinating the user's access to and use of the messaging system. A user may access the messaging system from a variety of endpoints, including mobile devices (e.g., cellphones), desktop computers, web browsers, specialized messaging clients, etc.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques for media endpoint configuration. Some embodiments are particularly directed to techniques for media endpoint configuration in a messaging system. In one embodiment, for example, an apparatus may comprise a messaging server component operative to receive a media message addressed to a recipient user account, the media message comprising a media identifier for a media item; and send the media message to a recipient client device associated with the recipient user account; and a media management component operative to send a media endpoint list to a recipient client device, the media endpoint list operative to configure the recipient client device to retrieve the media item by identifying the media item with the media identifier to a media endpoint determined based on the media endpoint list. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 6 illustrates an embodiment of a logic flow for the system of FIG. 1.

DETAILED DESCRIPTION

Figure 1:
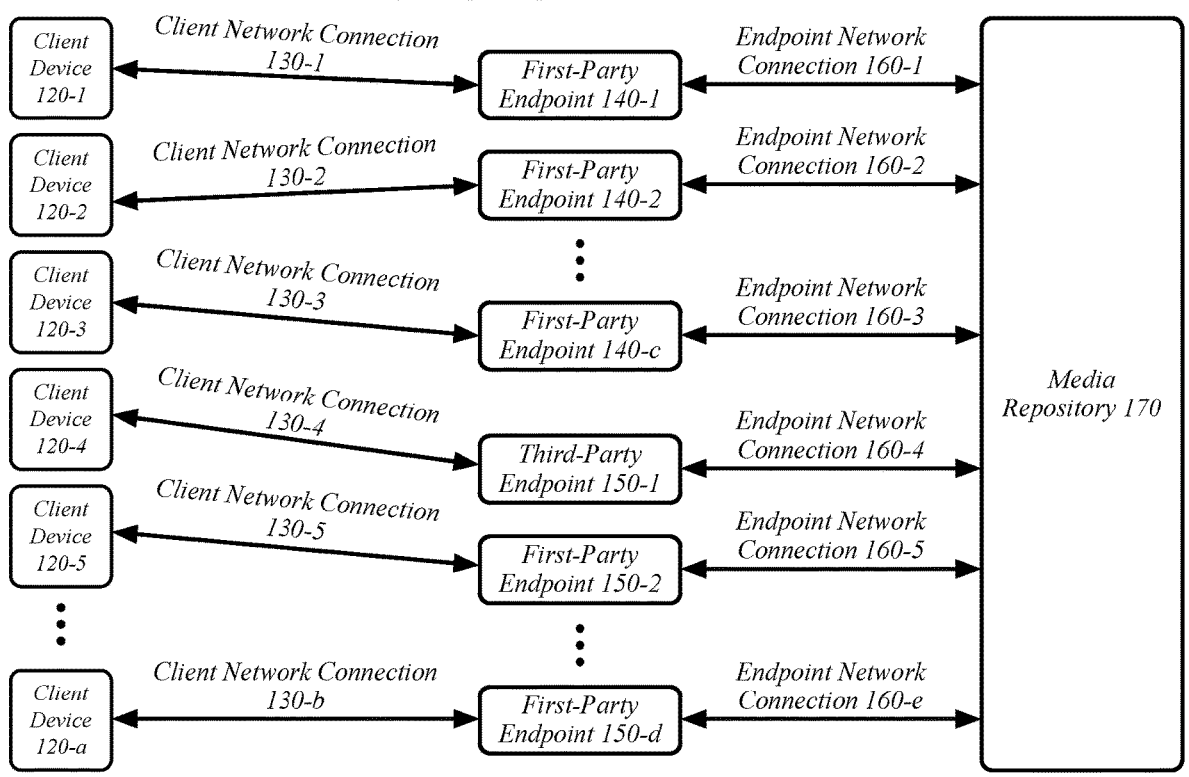
FIG. 1 illustrates an embodiment of a media distribution system.

Media uploads and downloads may be performed in a messaging system to empower the sending of media items between users of the messaging system. Media items may be identified by media identifiers that are distinct from location information indicating the storage location of the media items, as an alternative to the use of uniform resource locators (URLs) that comprise both a network address to retrieve the media item at and an identifier for the media item. This may empower the use of dynamically-generated media distribution endpoint configuration that is responsive to the location of the client devices uploading and downloading media and to the network conditions in which the client device is operating. The media identifier may comprise a cryptographic hash of the media item and be a unique media identifier across the messaging system.

To upload or download a media item, a messaging client connects to a media endpoint selected based on a list of media endpoints received from a messaging server for a messaging system. This list of media endpoints may be downloaded in response to an upload/download request, or may be pre-fetched in contexts in which an upload or download is considered possible, such as when foregrounding the messaging application. The list of media endpoints may be used to open a network connection in response to an upload/download request, or may be pre-warmed in contexts in which an upload or download is considered likely: when foregrounding the messaging clients in response to a media message being received, when using a photo-capture mode of the messaging client, or when selecting a list of recipients in a media forwarding interface. The list of media endpoints may include multiple addresses for each endpoint, such as by including both IP addresses and domain names. Either of the IPv4 and IPv6 standards for IP addresses may be used, without limitation.

As such, messaging clients may make use of media endpoints to which they have a good network connection and therefore receive improved performance in the uploading and downloading of media items. This may improve the performance of a messaging system in providing media distribution to its users.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-*a* may include components 122-1, 122-2, 122-3, 122-4 and 122-5. The embodiments are not limited in this context.

FIG. 1 illustrates a block diagram for a media distribution system 100. In one embodiment, the media distribution system 100 may comprise a computer-implemented system having software applications comprising one or more components. Although the media distribution system 100 shown in FIG. 1 has a limited number of elements in a certain topology, it may be appreciated that the media distribution system 100 may include more or less elements in alternate topologies as desired for a given implementation.

A communications system may be generally arranged to enable communication. For instance, a communication systems may receive, store, and deliver messages. A communications system may act as any sort of communications intermediary, such as for messaging, VoIP, online gaming, or other intermediated online interaction between multiple client devices. A communications system may store messages while communications applications, such as may execute on client devices 120, are offline and deliver the messages once the communications applications are available. A communications system may empower the engagement and performance of other communication tasks, such as audio and/or video calls.

A plurality of client devices 120 may operate as part of the media distribution system 100, transmitting messages and otherwise communicating between each other as part of a communications system. The client devices 120 may execute communications applications for the communications system, wherein each of the client devices 120 and their respective communications applications are associated with a particular user of the communications system. In some embodiments, the client devices 120 may be cellular devices such as smartphones and may be identified to the communications system based on a phone number associated with each of the client devices 120. In some embodiments, the client devices 120 may be identified to the communications system based on a user account registered with the communications system—and potentially a social networking system that comprises or is associated with the communications system—and logged into from the communications application executing on the client devices 120. In general, each communications application may be addressed through various techniques for the reception of messages. While in some embodiments the client devices 120 may comprise cellular devices, in other embodiments one or more of the client devices 120 may include personal computers, tablet devices, any other form of computing device without limitation. Personal computers and other devices may access a communications system using web browser accessing a web server, for instance.

Media items may be transferred between the client devices 120 as part of the operation of the communication system as a media distribution system 100. A media distribution system 100 is generally arranged to distribute media between client devices 120. In some embodiments, this media may use end-to-end encryption techniques in which the client devices 120 use encryption based on keys unavailable to the servers of the media distribution system 100 so as to prevent the servers of the media distribution system 100 from accessing the media being transferred between client devices 120 in an unencrypted form. A communications application, such as a messaging client, on a first client device 120-1 may send a media item to a second client device 120-4 using the media distribution system 100. The media item may be encrypted end-to-end during transport from a sender client device to a recipient client device such that the messaging servers are prevented from accessing the unencrypted form of the media item.

A first client device 120-1 may send a media item to a second client device 120-4 by using a media repository 170 of the media distribution system 100 to make the media item available to the second client device 120-4. Client devices 120 may open client network connections 130 to endpoints 140, 150 that provide access to the media repository 170. A first client device 120-1 may open a first client network connection 130-1 to a first-party endpoint 140-1 and upload the media item to the first-party endpoint 140-1. The first-party endpoint 140-1 may then upload the media item to the media repository 170 using an endpoint network connection 160-1. The second client device 120-4 may download the media item from another endpoint, such as a third party endpoint 150-1. The second client device 120-4 opens a client network connection 130-4 to the third-party endpoint 150-1 and downloads the media item over the client network connection 130-4. The third-party endpoint 150-1 may itself retrieve the media item from the media repository 170 using an endpoint network connection 160-4 where the media item is not already stored at the third-party endpoint 150-1. As such, the media repository 170 may serve as an intermediary store in the process of sending a media item from a first client device 10-1 to a second client device 120-4.

The media repository 170 may comprise a persistent media store maintained by the media distribution system 100. While media item may eventually be removed from the media repository 170 after reception by the users to which they are sent, the media repository 170 may attempt to maintain a local store of media items until such reception has occurred. In contrast, endpoints 140, 150 may cache media items, but are not responsible for persistent storage and may discard media items based on local caching policies on the expectation that the media item will be maintained in the media repository 170 and available for retrieval. Some of these endpoints may be first-party endpoints 140 maintained by the provider of the media distribution system 100 and the media repository 170. Some of these endpoints may be third-party endpoints 150 maintained by a separate entity from the provider of the media distribution system 100 and the media repository 170. For example, cellular providers, Internet service providers, and other entities may operate an endpoint to improve performance of the media distribution system 100.

The client devices 120 may communicate using wireless transmissions to exchange network traffic. Exchanging network traffic, such as may be included in the exchange of messaging transactions, may comprise transmitting and receiving network traffic via a network interface controller (NIC). A NIC comprises a hardware component connecting a computer device, such as each of client devices 120, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API). The network interface controller may be used for the network activities of the embodiments described herein, including the interoperation of messaging clients and messaging servers through network communication. For example, a messaging client transmitting or receiving messages to or from a messaging server may be interpreted as using the network interface controller for network access to a communications network for the transmission or reception of information.

Media distribution system 100 may include an authorization server (or other suitable component(s)) that allows users to opt in to or opt out of having their actions logged by media distribution system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of media distribution system 100 and other elements of a messaging system through blocking, data hashing, anonymization, or other suitable techniques as appropriate. For instance, a user may be empowered to configure privacy settings determining whether network performance information is logged by the media distribution system 100 and analyzed. In some embodiments, a user may be presented with information regarding may be collected and how that information may be used, such as informing the user that collected information may be anonymized prior to analysis.

Figure 2:
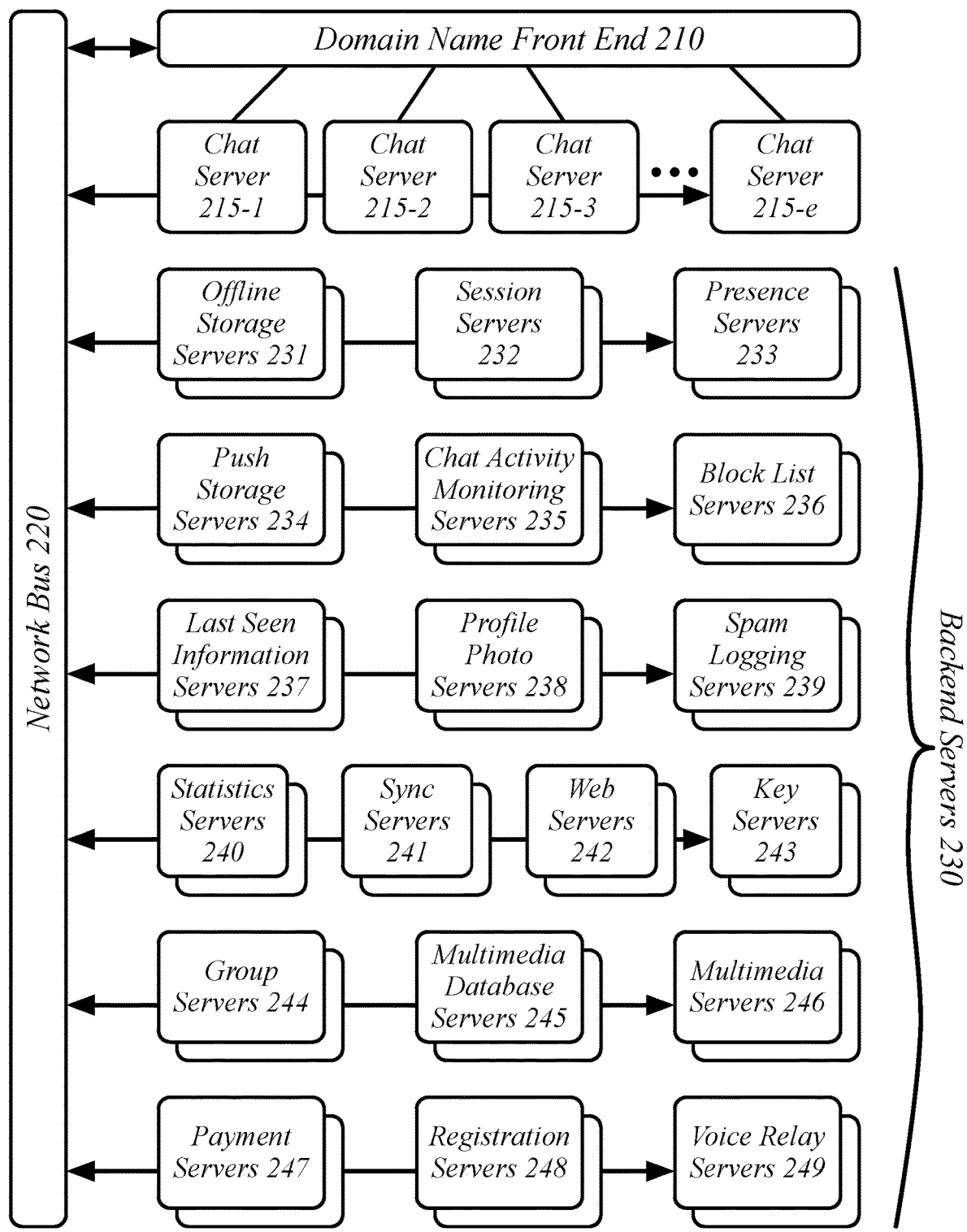
FIG. 2 illustrates an embodiment of a messaging system.

FIG. 2 illustrates an embodiment of a plurality of servers implementing various functions of a messaging system 200. It will be appreciated that different distributions of work and functions may be used in various embodiments of a messaging system 200. The messaging system 200 may comprise the multi-agent messaging system 100 with the operations of the media distribution system 100 comprising a portion of the overall operations of the messaging system 200. The illustrated embodiment of the messaging system 200 may particularly correspond to a portion of the messaging servers 110 described with reference to FIG. 1 comprising one or more server devices providing messaging services to the user of the messaging system 200.

The various servers of the messaging system 200 are connected via a network bus 220. The network bus 220 provides network connectivity between the domain name front end 210, the servers of the messaging system 220, and various external devices, such as client devices. Each of the servers is independently connected to the network bus 220 such that they may independently communicate with each other and/or user devices via the network bus 220.

The messaging system 200 may comprise a domain name front end 210. The domain name front end 210 may be assigned one or more domain names associated with the messaging system 200 in a domain name system (DNS). The domain name front end 210 may receive incoming connections and distribute the connections to servers providing various messaging services.

The messaging system 200 may comprise one or more chat servers 215. The chat servers 215 may comprise front-end servers for receiving and transmitting user-to-user messaging updates such as chat messages. Incoming connections may be assigned to the chat servers 215 by the domain name front end 210 based on workload balancing.

The messaging system 200 may comprise backend servers 230. The backend servers 230 may perform specialized tasks in the support of the chat operations of the front-end chat servers 215. A plurality of different types of backend servers 230 may be used. It will be appreciated that the assignment of types of tasks to different backend serves 230 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging system 200 may comprise one or more offline storage servers 231. The one or more offline storage servers 231 may store messaging content for currently-offline messaging endpoints in hold for when the messaging endpoints reconnect.

The messaging system 200 may comprise one or more sessions servers 232. The one or more session servers 232 may maintain session state of connected messaging endpoints.

The messaging system 200 may comprise one or more presence servers 233. The one or more presence servers 233 may maintain presence information for the messaging system 200. Presence information may correspond to user-specific information indicating whether or not a given user has an online messaging endpoint and is available for chatting, has an online messaging endpoint but is currently away from it, does not have an online messaging endpoint, and any other presence state.

The messaging system 200 may comprise one or more push storage servers 234. The one or more push storage servers 234 may cache push requests and transmit the push requests to messaging endpoints. Push requests may be used to wake messaging endpoints, to notify messaging endpoints that a messaging update is available, and to otherwise perform server-side-driven interactions with messaging endpoints.

The messaging system 200 may comprise one or more chat activity monitoring servers 235. The one or more chat activity monitoring servers 235 may monitor the chats of users to determine unauthorized or discouraged behavior by the users of the messaging system 200. The one or more chat activity monitoring servers 235 may work in cooperation with the spam logging servers 239 and block list servers 236, with the one or more chat activity monitoring servers 235 identifying spam or other discouraged behavior and providing spam information to the spam logging servers 239 and blocking information, where appropriate to the block list servers 236.

The messaging system 200 may comprise one or more block list servers 236. The one or more block list servers 236 may maintain user-specific block lists, the user-specific incoming-block lists indicating for each user the one or more other users that are forbidden from transmitting messages to that user. Alternatively or additionally, the one or more block list servers 236 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging system 200 may comprise one or more last seen information servers 237. The one or more last seen information servers 237 may receive, store, and maintain information indicating the last seen location, status, messaging endpoint, and other elements of a user's last seen connection to the messaging system 200.

The messaging system 200 may comprise one or more profile photo servers 238. The one or more profile photo servers 238 may store and make available for retrieval profile photos for the plurality of users of the messaging system 200.

The messaging system 200 may comprise one or more spam logging servers 239. The one or more spam logging servers 239 may log known and suspected spam (e.g., unwanted messages, particularly those of a promotional nature). The one or more spam logging servers 239 may be operative to analyze messages to determine whether they are spam and to perform punitive measures, in some embodiments, against suspected spammers (users that send spam messages).

The messaging system 200 may comprise one or more statistics servers 240. The one or more statistics servers may compile and store statistics information related to the operation of the messaging system 200 and the behavior of the users of the messaging system 200.

The messaging system 200 may comprise one or more sync servers 241. The one or more sync servers 241 may sync the messaging system 240 with contact information from a messaging endpoint, such as an address book on a mobile phone, to determine contacts for a user in the messaging system 200.

The messaging system 200 may comprise one or more web servers 242. The one or more web servers 242 may engage in hypertext transport protocol (HTTP) and hypertext transport protocol secure (HTTPS) connections with web browsers. The one or more web servers 242 may, in some embodiments, host the remote web server 350 as part of the operation of the media distribution system 100.

The messaging system 200 may comprise one or more key servers 243. The one or more key servers 243 may host public keys for public/private key encrypted communication.

The messaging system 200 may comprise one or more group servers 244. The one or more group servers 244 may maintain lists of groups, add users to groups, remove users from groups, and perform the reception, caching, and forwarding of group chat messages.

The messaging system 200 may comprise one or more multimedia database (MMD) servers 245. The MMD servers 245 may store a database, which may be a distributed database, of media objects known to the messaging system 200. In some embodiments, only media objects currently stored or otherwise in-transit within the messaging system 200 may be tracked by the MMD servers 245. In other embodiments, the MMD servers 245 may maintain a record of media objects that are no longer in-transit, such as may be for tracking popularity or other data-gathering purposes.

The MMD servers 245 may determine the storage location of media objects when they are to be stored by the messaging system 200, such as on multimedia servers 246. The MMD servers 245 may determine the existing storage location of media objects when they are to be transmitted by the messaging system 200, such as which of a plurality of multimedia servers 236 store a particular media object. The MMD servers 245 may generate the uniform resource locators (URLs) for use by messaging clients to request and retrieve media objects. The MMD servers 245 may track when a media object has been corrupted or otherwise lost and should be reacquired.

The messaging system 200 may comprise one or more multimedia servers 246. The one or more multimedia servers may store multimedia (e.g., images, video, audio) in transit between messaging endpoints, multimedia cached for offline endpoints, and may perform transcoding of multimedia.

The messaging system 200 may comprise one or more payment servers 247. The one or more payment servers 247 may process payments from users. The one or more payment servers 247 may connect to external third-party servers for the performance of payments.

The messaging system 200 may comprise one or more registration servers 248. The one or more registration servers 248 may register new users of the messaging system 200.

The messaging system 200 may comprise one or more voice relay servers 249. The one or more voice relay servers 249 may relay voice-over-internet-protocol (VoIP) voice communication between messaging endpoints for the performance of VoIP calls.

Figure 3:
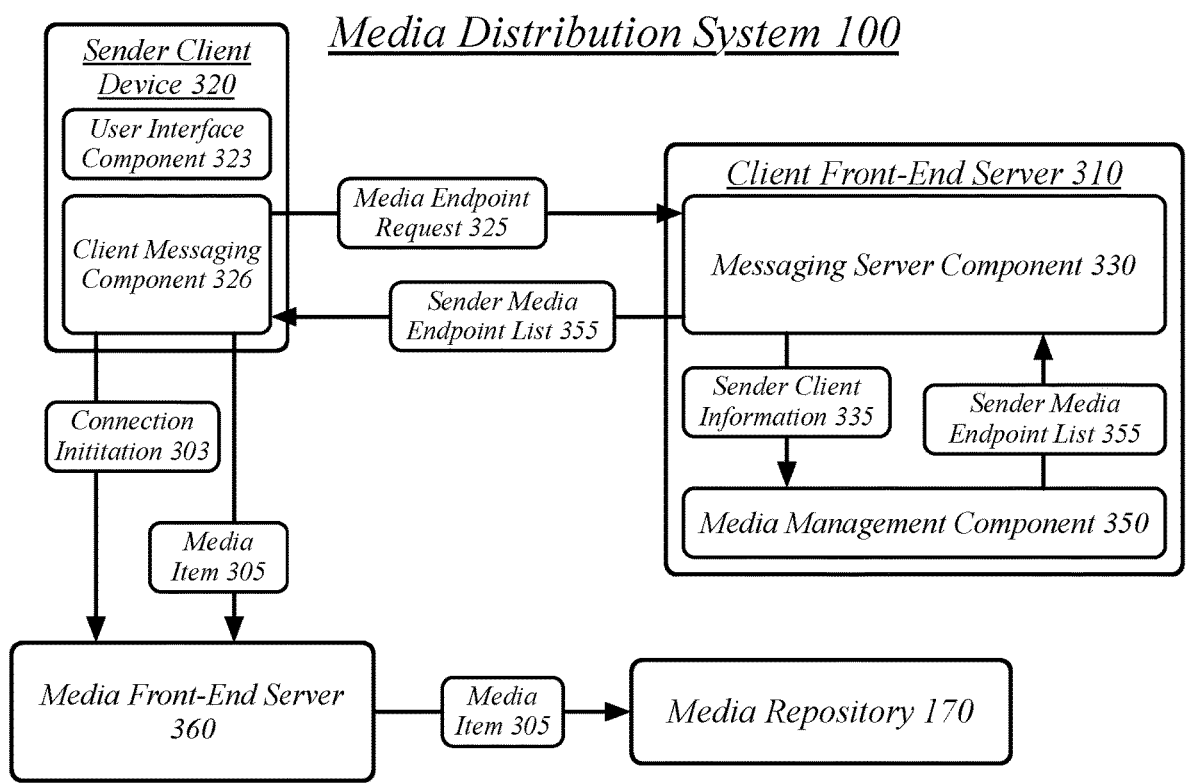
FIG. 3 illustrates an embodiment of a sender client device configuring and performing an upload of a media item.

FIG. 3 illustrates an embodiment of a sender client device 320 configuring and performing an upload of a media item 305 based on a media endpoint list 355.

A media distribution system 100 for a messaging system 200 may comprise a plurality of components. In some embodiments, these plurality of components may be distributed among a plurality of servers. In other embodiments, a single server may implement the plurality of components. In some embodiments, a plurality of servers may be executed by a single server device. In other embodiments, the plurality of servers may be executed by a plurality of server devices. In some embodiments, multiple instances of the various components and various servers may be executed to provide redundancy, improved scaling, and other benefits. Similarly, a client device may execute a plurality of components as part of a messaging client.

A messaging client may comprise a user interface component 323. A user interface component 323 may be generally arranged to display user interfaces to a user of a client device and to receive user commands for the messaging client for the client device. A messaging client may comprise a client messaging component 326. A client messaging component 326 may be generally arranged to conduct messaging interactions on the behalf of the messaging client via communication with the client front-end server 310.

A client front-end server 310 may be generally arranged to act as a network access point to a messaging system 200 for client devices such as sender client device 320. The client front-end server 310 may comprise a messaging server component 330, the messaging server component 330 generally arranged to act as a network access point to messaging services for the messaging system 200. The messaging server component 330 may receive messages from client devices and add the messages to message queues.

The client messaging component 326 of a messaging client sends a media endpoint request 325 to the messaging server component 330. The media endpoint request 325 requests to the messaging server component 330 that the messaging client be provided with a media endpoint list 355 for use in exchanging media via the media distribution system 100. The media endpoint request 325 may comprise sender client information 335 relevant to the construction of the media endpoint list 355.

The messaging server component 330 receives the media endpoint request 325 and provides sender client information 335 to the media management component 350. The sender client information 335 may comprise sender client information 335 received from the sender client device 320 and/or may comprise sender client information 335 generated by the messaging server component 330. For instance, the messaging server component 330 may collect network information based on the network transmission of the media endpoint request 325 through a network and include this network information in the sender client information 335. This network information may include a network address for the sender client device 320, network routing information for the sender client device 320, or any other relevant information.

The media management component 350 receives the sender client information 335 and generates a sender media endpoint list 355 configured for the sender client device 320. The media management component 350 sends the sender media endpoint list 335 to the sender client device 320 via the messaging server component 330. The media management component 350 provides the sender media endpoint list 355 to the messaging server component 330, which then sends the sender media endpoint list 355 to the client messaging component 325 of the messaging client on the sender client device 320.

The media endpoint list configures the sender client device 320 to upload a media item 305 to a media endpoint determined based on the sender media endpoint list 355. The sender media endpoint list 355 comprises a plurality of media endpoint entries. These media endpoint entries may be ranked by priority, with the messaging client configured to prefer higher-ranked media endpoints. Alternatively, the messaging client may be provided with no preferences as to which media endpoints should be preferred. Each media endpoint entry of the plurality of media endpoint entries may comprise an Internet Protocol (IP) address for a media endpoint and a domain name address for the media endpoint. The messaging client may prefer the domain name address and use the IP address where domain name resolution of the domain name address fails or the domain name address is otherwise unusable.

The media endpoint request 325 may be performed in response to a variety of events on the sender client device 320. The sender media endpoint list 355 may therefore be retrieved and sent to the sender client device 320 in response to any of this variety of events. A media endpoint request 325 may be sent in response to a media upload request by a user where a user configures and sends a media message that includes a media item 305 attached by the user.

In some cases, the sender media endpoint list 355 may be sent to the recipient client device in response to a media capture mode engagement of a messaging client on the sender client device 320, such that the sender media endpoint list 355 is sent to the sender client device 320 in response to a messaging client on the sender client device 320 engaging a media capture mode. The media capture mode empowers a user of the sender client device 320 to capture media, such as, without limitation, photos, videos, and/or audio. The media endpoint request 325 may be performed in response to an engagement of a media capture mode of the messaging client—or of the sender client device 320 in general—in order to have the messaging client be prepared to send a captured photo. The retrieval of the sender media endpoint list 355 primes the messaging client to upload a photo as a media item 305 so that the user doesn't have to wait for one to be retrieved if they eventually choose to send the photo.

Similarly, the sender media endpoint list 355 sent to the sender client device 320 in response to a media forwarding interface selection of a messaging client on the sender client device 320. The media endpoint request 325 may be performed in response to an engagement of a media forwarding interface of the messaging client, such that the sender media endpoint list 355 is sent to the sender client device 320 in response to a messaging client on the sender client device 320 receiving a user selection of the media forwarding interface, with the user selection performed by a user of the sender client device 320. A media forwarding interface empowers a user to select one or more media items and forward them to one or more users. The client messaging component 326 may retrieve the sender media endpoint list 355 in response to the media forwarding interface selection prior to the user instructing the messaging client to actually send a particular media item.

The messaging client on the sender client device 320 tests the plurality of media endpoints identified by the media endpoint list to determine a selected media endpoint. Testing the plurality of media endpoints comprises performing a network test such as determining the round-trip time between the sender client device 320 and each of the media endpoints, and selecting the media endpoint with the lowest round-trip time. Additional or alternative tests may be used, such as testing the available bandwidth between the sender client device 320 and each media endpoint by transferring a test file. Various techniques may be used.

The client messaging component 326 then initiates a media transfer network connection with the selected media endpoint in a client-side connection initiation 303. The client messaging component 326 of the messaging client uploads the media item 305 to the selected media endpoint. A media front-end server 360 of a media endpoint may perform media endpoint operations, including empowering client devices to upload and download media items exchanged via the media distribution system 100. A media endpoint is an intermediary between the media repository 170 of the media distribution system 100 and various client devices. The media endpoints provided to a client device are selected based on their network proximity—and, often, geographic proximity—to a client device and therefore may provide higher-performance access to media items than a direct connection to the media repository 170 and may further provide caching services that reduce the load on a media repository 170 by replying to multiple client requests for a media item 305 (such as by different client devices receiving the media item 305) based on a single request for the media item 305 from the media repository 170.

Figure 4:
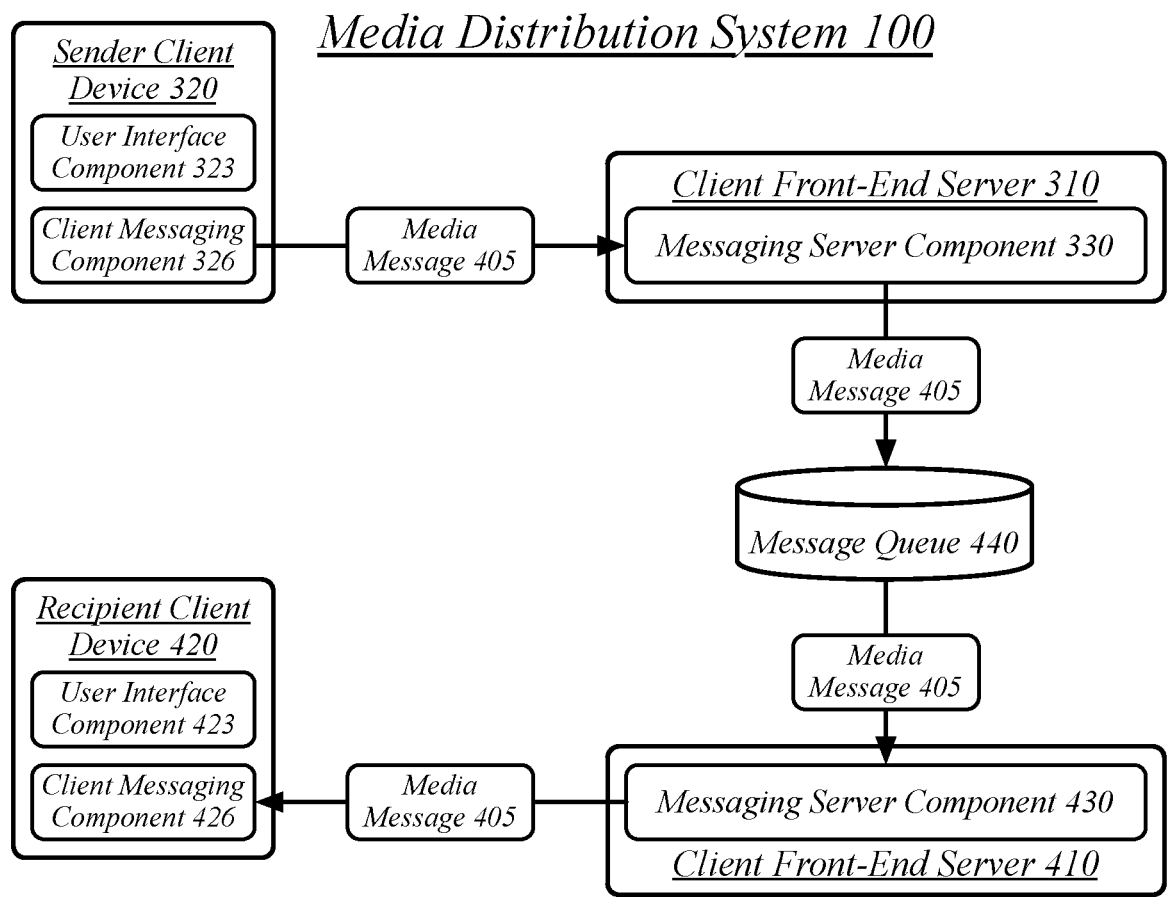
FIG. 4 illustrates an embodiment of a media message being sent via a message queue.

FIG. 4 illustrates an embodiment of a media message 405 being sent via a message queue 440.

A message queue 440 may be specifically associated with the user of sender client device 320, such as by being uniquely associated within the messaging system 200 with a user account for the user of sender client device 320 or with a user account for the user of recipient client device 420. The message queue 440 may be a single queue used for all messaging endpoints used by this user. The message queue 440 may comprise a representation of updates in a strict linear order. The message queue 440 may be organized as a data unit according to a variety of techniques. The message queue 440 may be stored in semi-persistent memory, persistent storage, both semi-persistent memory and persistent storage, or a combination of the two. The message queue 440 may be organized according to a variety of data structures, including linked lists, arrays, and other techniques for organizing queues. The message queue 440 may generally comprise a first-in-first-out (FIFO) queue in which no update will be removed or retrieved from the queue before any updates that were received prior to it.

A messaging conversation is exchanged via a messaging system 200. This messaging conversation involves at least one client device, such as a sender client device 320 and/or a recipient client device 420. Messages may be sent from a client messaging component 326 of a messaging client on a sender client device 320. A message is associated with a messaging conversation, the messaging conversation involving two or more participants, including the user of the sender client device 320. A message comprises a portion of the messaging conversation. Each participant in a messaging conversation has their own perspective on the messaging conversation, which may be represented as a message thread on their respective client device.

Messages are received by the messaging server component 330 of the client front-end server 310 and are added to a message queue 440 associated with the sender. The messages are distributed using the message queue 440 to the recipient client device 420 by a messaging server component 430 of a client front-end server 410 serving the recipient client device 420. The client front-end server 410 and messaging server component 430 may be substantially similar to the client front-end server 310 and messaging server component 330. In some cases, the sender client device 320 and recipient client device 420 may exchange messages using the same client front-end server and messaging server component. Messages may also be redistributed back to the sender client device 320 for association with the message conversation and message thread.

The messaging server component 330 is operative to receive a media message 405 addressed to a recipient user account. This media message 405 comprises a media identifier for the media item 305, with the media item 305 not directly included in the media message 405 but rather referenced by it for eventual retrieval, if desired, by the receiving user of the recipient client device 420. The messaging system 200 then sends the media message 405 to the recipient client device 420 associated with the recipient user account. The recipient client device 420 comprises a messaging client with a user interface component 423 and client messaging component 426 substantially similar to the user interface component 323 and client messaging component 326 of the messaging client of the sender client device 320.

Figure 5:
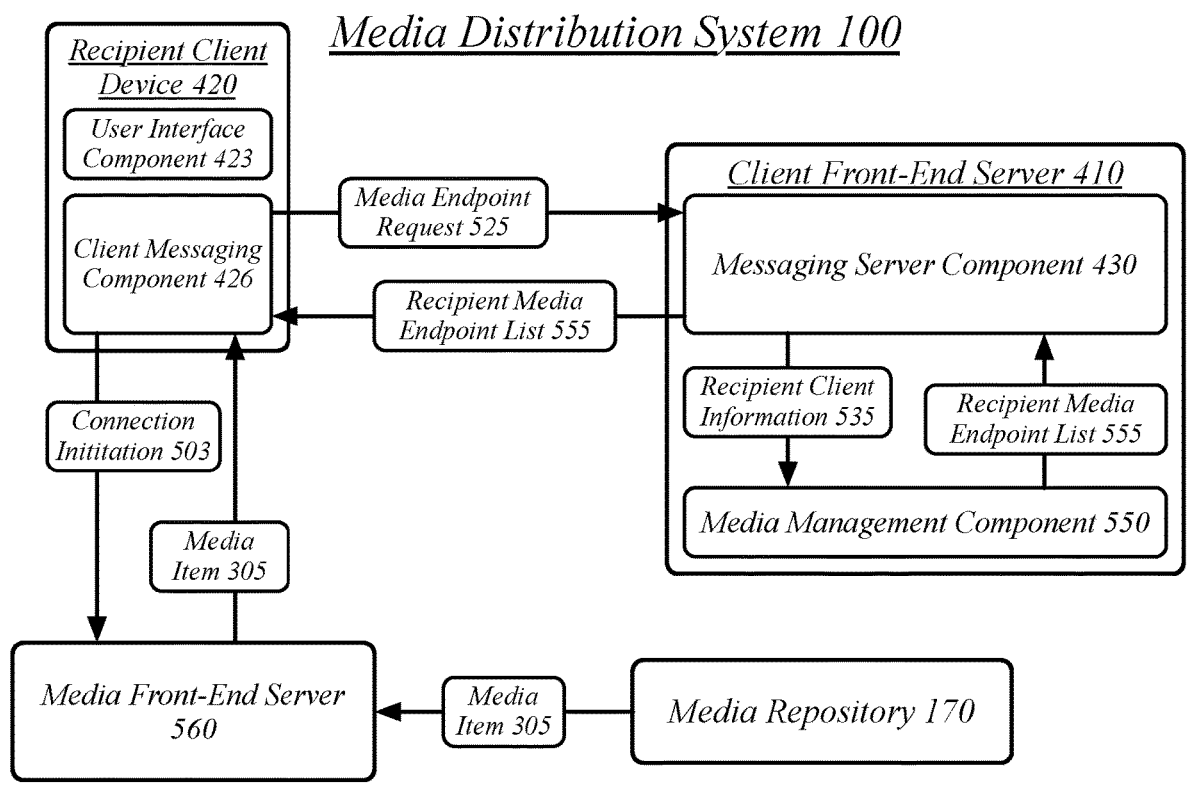
FIG. 5 illustrates an embodiment of a recipient client device configuring and performing a download of a media item.

FIG. 5 illustrates an embodiment of a recipient client device 420 configuring and performing a download of a media item 305 based on a media endpoint list 555.

The client front-end server 410 supporting the recipient client device 420 comprises a media management component 550 substantially similar to the media management component 350 of the client front-end server 310 supporting the sender client device 320. This media management component 550 is similarly operative to send a recipient media endpoint list 555 to a recipient client device 420. The recipient media endpoint list 555 is operative to configure the recipient client device 420 to retrieve the media item 305 by identifying the media item 305 with the media identifier to a media endpoint determined based on the recipient media endpoint list 555.

The recipient media endpoint list 555 may comprise a plurality of media endpoint entries, wherein each media endpoint entry of the plurality of media endpoint entries comprises an IP address for a media endpoint and a domain name address for the media endpoint. The media management component 550 may generate the media endpoint list based on a network address for the recipient client device. In general, the media management component 550 generates the recipient media endpoint list 355 so as to select media endpoints that are expected to provide the best available network performance to the recipient client device 420. The selection of the media endpoints may be performed by an existing network performance evaluation system of the messaging system 200 using known techniques for network performance evaluation and the selection of endpoints for client access based on network performance evaluation.

The messaging client of the recipient client device 420 is operative to test the plurality of media endpoints identified by the recipient media endpoint list 555 to determine a selected media endpoint. The messaging client is operative to initiate a media transfer network connection with the selected media endpoint via a connection initiation 503 to a media front-end server 560 reached based on the network address of the selected media endpoint entry for the selected media endpoint. The messaging client is operative to download the media item 305 from the selected media endpoint by identifying the media item 305 using the media identifier. The media front-end server 360 retrieves the media item 305 from the media repository 170 when it does not have the media item 305 stored in a local store after a request for the media item 305 by the recipient client device 420. The media front-end server 360 retrieves the media item 305 from a local store when it does have the media item 305 stored in a local store.

The recipient media endpoint list 555 is sent to the recipient client device 420 in response to a media endpoint request 525 substantially similar to the media endpoint request 325 by the sender client device 320. As with the sender media endpoint request 325, the recipient media endpoint request 525 may be performed in response to various events on the recipient client device 420. The recipient media endpoint list 555 may be sent to the recipient client device 420 in response to a media download request by a user of the device. For instance, the recipient client device 420 may be configured to not automatically download media items. As such, the recipient media endpoint request 525 may be sent to the recipient client device 420 in response to a media download request by the user of the media item 305.

The recipient client device 420 may be sent a media message notification to notify it and the user of the available media message 405. The media message notification may be displayed to the user of the recipient client device 420. The messaging client may receive the media message notification and send the media endpoint request 525 to the messaging server component 430 in response to receiving the media message notification. Alternatively, the messaging client may send the media endpoint request 525 in response to a messaging client foregrounding of the messaging client based on the media message notification for the media message on the recipient client device. That is, the messaging client may send the media endpoint request 525 where the foregrounding of the messaging client is performed by selection of the media message notification, such that the messaging client foregrounding is based on the media message notification for the media message being activated on the recipient client device. Alternatively, the messaging client may send the media endpoint request 525 on any foregrounding following the reception of a media message notification. Further, in some embodiments, the messaging client may send the media endpoint request 525 on any foregrounding following the reception of a media message 405.

In some embodiments, the messaging client may also initiate a media download network connection with a connection initiation 503 using the recipient media endpoint list 555 in response to the messaging client foregrounding based on the media message notification, such that the media download network connection is initiated in response to the messaging client foregrounding that was based on the media message notification. This further primes the messaging client for the download of the media item 305, though it may still refrain from actually downloading the media item 305 until the user specifically requests that it be downloaded. In some embodiments, the media download network connection, which may generally correspond to a media network connection available for upload and/or download, may be kept open for a period of time to allow for the subsequent uploading and/or downloading of media items without establishing a subsequent connection. The media network connection may be kept open for a predefined period of time, which period of time may be extended upon using the media network connection. As such, in some cases, the upload or download of a media item 305 may be performed using an already-open media network connection between a client device and a media front-end server, the media network connection already open because of a previous upload or previous download of a previous media item.

The media download network connection may comprise an end-to-end encrypted network connection, wherein the media item 305 is encrypted end-to-end during transport from a sender client device 320 to the recipient client device 420. The media item 305 may be encrypted using an encryption key such that the decryption key is withheld from the messaging servers and only made available to the client devices involved in the end-to-end encrypted network connection. A decryption key may be, without limitation, the encryption key being used as a decryption key or the second half of an asymmetric-encryption key pair.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 6 illustrates one embodiment of a logic flow 600. The logic flow 600 may be representative of some or all of the operations executed by one or more embodiments described herein.

In the illustrated embodiment shown in FIG. 6, the logic flow 600 may receive a media message addressed to a recipient user account, the media message comprising a media identifier for a media item at block 602.

The logic flow 600 may send the media message to a recipient client device associated with the recipient user account at block 604.

The logic flow 600 may send a media endpoint list to a recipient client device, the media endpoint list operative to configure the recipient client device to retrieve the media item by identifying the media item with the media identifier to a media endpoint determined based on the media endpoint list at block 606.

The embodiments are not limited to this example.

Figure 7:
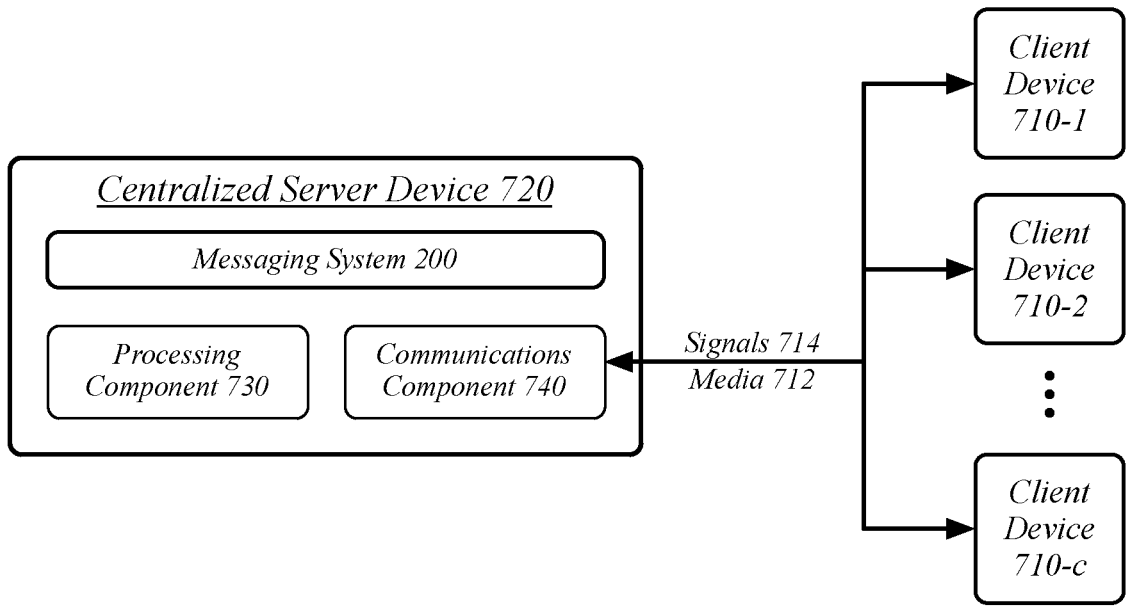
FIG. 7 illustrates an embodiment of a centralized system for the system of FIG. 1.

FIG. 7 illustrates a block diagram of a centralized system 700. The centralized system 700 may implement some or all of the structure and/or operations for a messaging system 200, including the media distribution system 100, in a single computing entity, such as entirely within a single centralized server device 720.

The centralized server device 720 may comprise any electronic device capable of receiving, processing, and sending information for the media distribution system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 720 may execute processing operations or logic for the messaging system 200 using a processing component 730. The processing component 730 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 720 may execute communications operations or logic for the messaging system 200 using communications component 740. The communications component 740 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 740 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 712 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 720 may communicate with other devices over a communications media 712 using communications signals 714 via the communications component 740. The devices may be internal or external to the centralized server device 720 as desired for a given implementation. The centralized server device 720 may communicate with a plurality of client devices 710, providing messaging services to the client devices 710.

Figure 8:
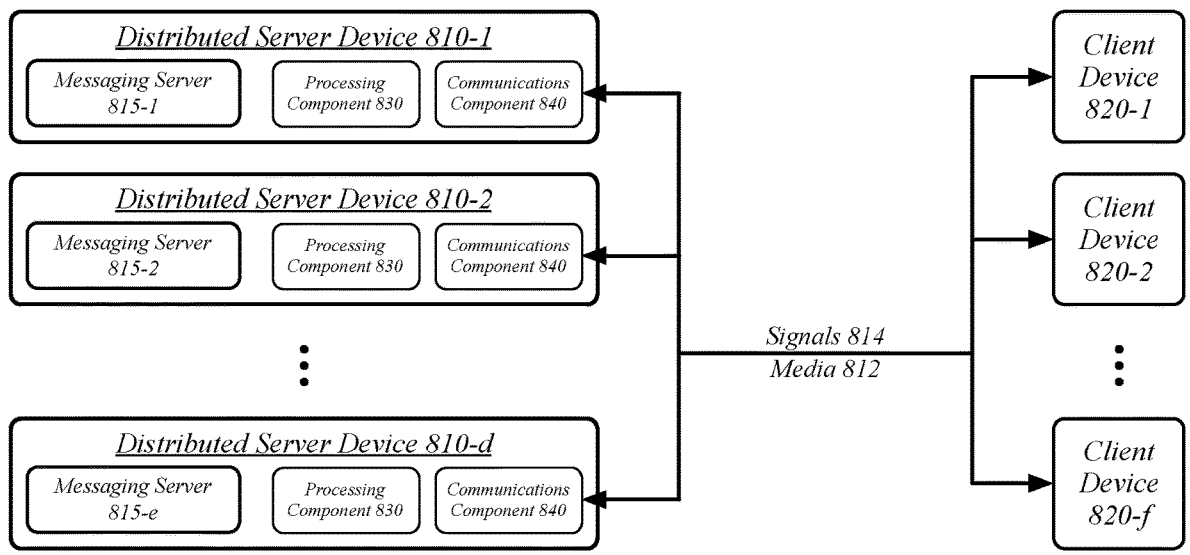
FIG. 8 illustrates an embodiment of a distributed system for the system of FIG. 1.

FIG. 8 illustrates a block diagram of a distributed system 800. The distributed system 800 may distribute portions of the structure and/or operations for the messaging system 200, including the media distribution system 100, across multiple computing entities. Examples of distributed system 800 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 800 may comprise a plurality of distributed server devices 810. In general, the server devices 810 may be the same or similar to the centralized server device 710 as described with reference to FIG. 7. For instance, the server devices 810 may each comprise a processing component 830 and a communications component 840 which are the same or similar to the processing component 730 and the communications component 740, respectively, as described with reference to FIG. 7. In another example, the server devices 810 may communicate over a communications media 812 using communications signals 814 via the communications components 840.

The plurality of distributed server devices 810 may comprise or employ one or more server programs that operate to perform various methodologies in accordance with the described embodiments. In one embodiment, for example, the plurality of distributed server devices 810 may each implement a messaging server 815. The messaging servers 815 may generally correspond to the messaging servers 110 and may implement the operations of the messaging system 200 across a plurality of computing devices.

Figure 9:
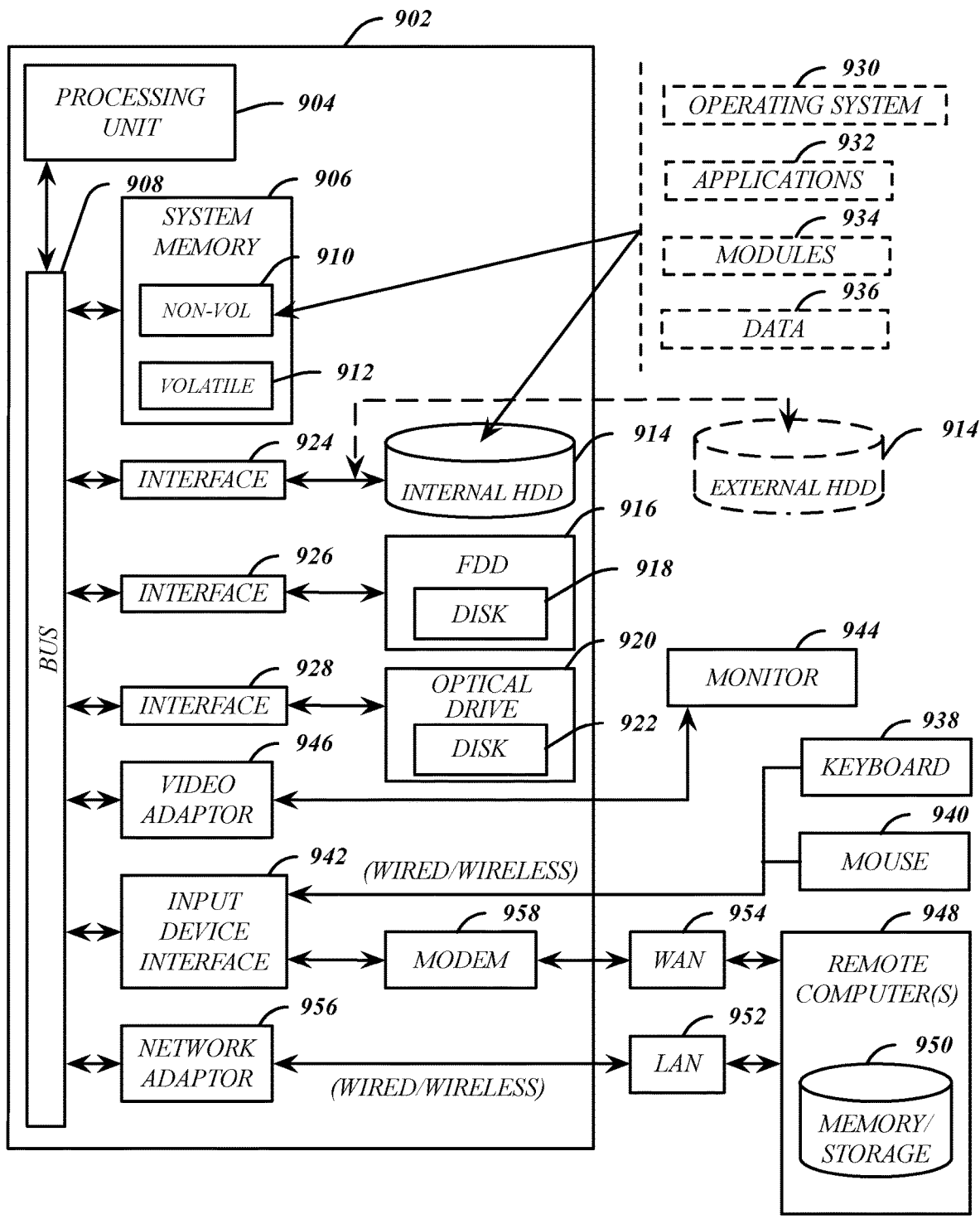
FIG. 9 illustrates an embodiment of a computing architecture.

FIG. 9 illustrates an embodiment of an exemplary computing architecture 900 suitable for implementing various embodiments as previously described. In one embodiment, the computing architecture 900 may comprise or be implemented as part of an electronic device. Examples of an electronic device may include those described with reference to FIG. 7, 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an Athlon®, Duron® and Opteron® processors; embedded and secure processors; DragonBall® and PowerPC® processors; Cell processors; Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the media distribution system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
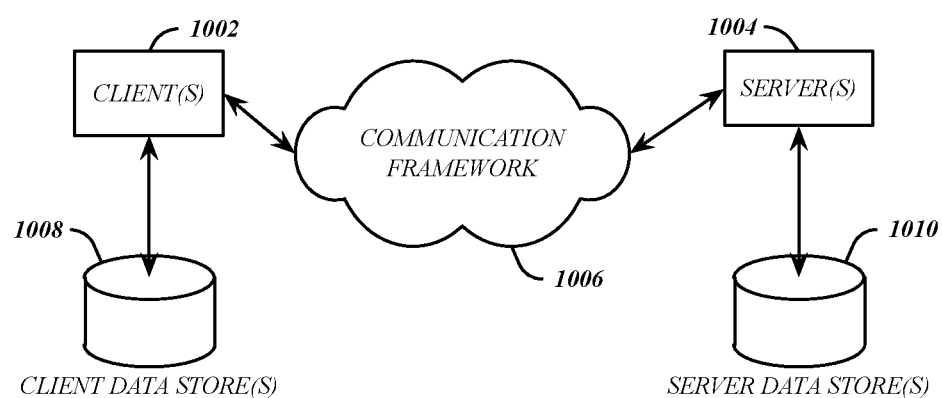
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 may comprise various messaging clients on various client devices. The servers 1004 may comprise the messaging servers of the messaging system 200, including the media distribution system 100. The clients 1002 and the servers 1004 are operatively connected to one or more respective client data stores 1008 and server data stores 1010 that can be employed to store information local to the respective clients 1002 and servers 1004, such as cookies and/or associated contextual information.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 11:
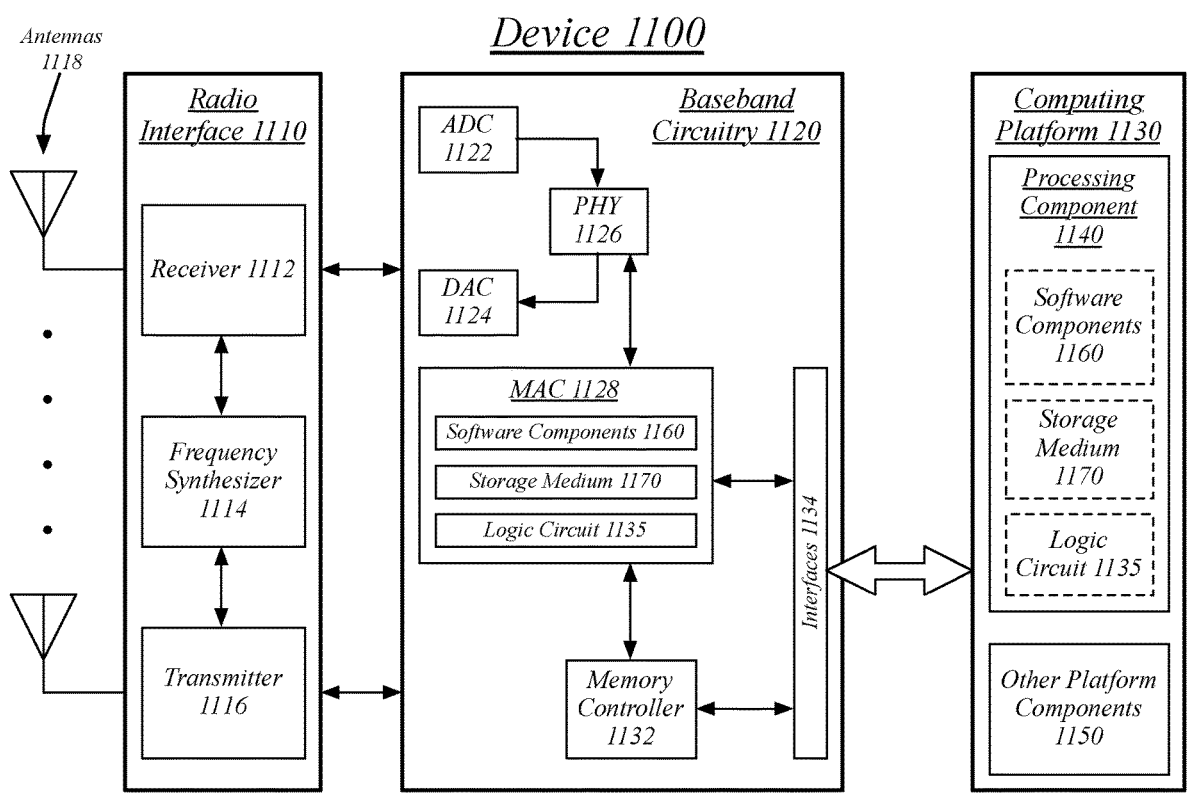
FIG. 11 illustrates an embodiment of a radio device architecture.

FIG. 11 illustrates an embodiment of a device 1100 for use in a multicarrier OFDM system, such as the media distribution system 100. Device 1100 may implement, for example, software components 1160 as described with reference to media distribution system 100 and/or a logic circuit 1135. The logic circuit 1135 may include physical circuits to perform operations described for the media distribution system 100. As shown in FIG. 11, device 1100 may include a radio interface 1110, baseband circuitry 1120, and computing platform 1130, although embodiments are not limited to this configuration.

The device 1100 may implement some or all of the structure and/or operations for the media distribution system 100 and/or logic circuit 1135 in a single computing entity, such as entirely within a single device. Alternatively, the device 1100 may distribute portions of the structure and/or operations for the media distribution system 100 and/or logic circuit 1135 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1110 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1110 may include, for example, a receiver 1112, a transmitter 1116 and/or a frequency synthesizer 1114. Radio interface 1110 may include bias controls, a crystal oscillator and/or one or more antennas 1118. In another embodiment, radio interface 1110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1120 may communicate with radio interface 1110 to process receive and/or transmit signals and may include, for example, an analog-to-digital converter 1122 for down converting received signals, a digital-to-analog converter 1124 for up converting signals for transmission. Further, baseband circuitry 1120 may include a baseband or physical layer (PHY) processing circuit 1156 for PHY link layer processing of respective receive/transmit signals. Baseband circuitry 1120 may include, for example, a processing circuit 1128 for medium access control (MAC)/data link layer processing. Baseband circuitry 1120 may include a memory controller 1132 for communicating with processing circuit 1128 and/or a computing platform 1130, for example, via one or more interfaces 1134.

In some embodiments, PHY processing circuit 1126 may include a frame construction and/or detection module, in combination with additional circuitry such as a buffer memory, to construct and/or deconstruct communication frames, such as radio frames. Alternatively or in addition, MAC processing circuit 1128 may share processing for certain of these functions or perform these processes independent of PHY processing circuit 1126. In some embodiments, MAC and PHY processing may be integrated into a single circuit.

The computing platform 1130 may provide computing functionality for the device 1100. As shown, the computing platform 1130 may include a processing component 1140. In addition to, or alternatively of, the baseband circuitry 1120, the device 1100 may execute processing operations or logic for the media distribution system 100 and logic circuit 1135 using the processing component 1140. The processing component 1140 (and/or PHY 1126 and/or MAC 1128) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth.

Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1130 may further include other platform components 1150. Other platform components 1150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1100 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1100 described herein, may be included or omitted in various embodiments of device 1100, as suitably desired. In some embodiments, device 1100 may be configured to be compatible with protocols and frequencies associated one or more of the 3GPP LTE Specifications and/or IEEE 1102.16 Standards for WMANs, and/or other broadband wireless networks, cited herein, although the embodiments are not limited in this respect.

Embodiments of device 1100 may be implemented using single input single output (SISO) architectures. However, certain implementations may include multiple antennas (e.g., antennas 1118) for transmission and/or reception using adaptive antenna techniques for beamforming or spatial division multiple access (SDMA) and/or using MIMO communication techniques.

The components and features of device 1100 may be implemented using any combination of discrete circuitry, application specific integrated circuits (ASICs), logic gates and/or single chip architectures. Further, the features of device 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving a media message addressed to a recipient user account, the media message comprising a media identifier for a media item; sending the media message to a recipient client device associated with the recipient user account; and sending a media endpoint list to a recipient client device, the media endpoint list operative to configure the recipient client device to retrieve the media item by identifying the media item with the media identifier to a media endpoint determined based on the media endpoint list.

A computer-implemented method may further comprise the media identifier comprising a hash of the media item.

A computer-implemented method may further comprise the media endpoint list sent to the recipient client device in response to a media download request.

A computer-implemented method may further comprise the media endpoint list sent to the recipient client device in response to a media upload request.

A computer-implemented method may further comprise the media endpoint list sent to the recipient client device in response to a messaging client foregrounding based on a media message notification for the media message on the recipient client device.

A computer-implemented method may further comprise the messaging client operative to initiate a media download network connection using the media endpoint list in response to the messaging client foregrounding based on the media message notification.

A computer-implemented method may further comprise the media endpoint list sent to the recipient client device in response to a media capture mode engagement of a messaging client on the recipient client device.

A computer-implemented method may further comprise the media endpoint list sent to the recipient client device in response to a media forwarding interface selection of a messaging client on the recipient client device.

A computer-implemented method may further comprise the media endpoint list comprising a plurality of media endpoint entries, wherein each media endpoint entry of the plurality of media endpoint entries comprises an Internet Protocol address for a media endpoint and a domain name address for the media endpoint.

A computer-implemented method may further comprise generating the media endpoint list based on a network address for the recipient client device.

A computer-implemented method may further comprise the recipient client device comprising a messaging client, the messaging client operative to test a plurality of media endpoints identified by the media endpoint list to determine a selected media endpoint, the messaging client operative to initiate a media transfer network connection with the selected media endpoint, the messaging client operative to download the media item from the selected media endpoint by identifying the media item using the media identifier.

A computer-implemented method may further comprise the media endpoint list sent to the recipient client device in response to a messaging client foregrounding, wherein the messaging client foregrounding is based on a media message notification for the media message being activated on the recipient client device, the messaging client operative to initiate a media download network connection using the media endpoint list, the media download network connection initiated in response to the messaging client foregrounding that was based on the media message notification.

A computer-implemented method may further comprise the media download network connection comprising an end-to-end encrypted network connection, wherein the media item is encrypted end-to-end during transport from a sender client device to the recipient client device.

A computer-implemented method may further comprise the media endpoint list sent to the recipient client device in response to a messaging client on the recipient client device engaging a media capture mode.

A computer-implemented method may further comprise the media endpoint list sent to the recipient client device in response to a messaging client on the recipient client device receiving a user selection of a media forwarding interface.

An apparatus may comprise a messaging server component operative to receive a media message addressed to a recipient user account, the media message comprising a media identifier for a media item; and send the media message to a recipient client device associated with the recipient user account; and a media management component operative to send a media endpoint list to a recipient client device, the media endpoint list operative to configure the recipient client device to retrieve the media item by identifying the media item with the media identifier to a media endpoint determined based on the media endpoint list. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
receiving a media message addressed to a recipient account, the media message comprising a hash of a media item stored in a media repository, the hash distinct from location information indicating at least one storage location of the media item;
sending the media message to a recipient client device associated with the recipient account;
generating a media endpoint list comprising a plurality of media endpoint entries, each media endpoint entry corresponding to a respective intermediary device of a plurality of intermediary devices between the media repository and the recipient client device; and
sending the media endpoint list to the recipient client device, the media endpoint list to cause the recipient client device to:
select a first media endpoint entry of the plurality of media endpoint entries;
send, based on the selection of the first media endpoint entry, the hash of the media item to the intermediary device corresponding to the first media endpoint entry; and
retrieve, based on sending the hash, the media item from the media repository via the intermediary device corresponding to the first media endpoint entry.

2. The method of claim 1, each media endpoint entry based on a proximity of the corresponding intermediary device and the recipient client device, the media message received from a sender client device, the media endpoint list generated based on a network address of the recipient client device, the hash uniquely identifying the media item in the media repository.

3. The method of claim 1, the media endpoint list sent to the recipient client device in response to a messaging client foregrounding, wherein the messaging client foregrounding is based on a media message notification for the media message being activated on the recipient client device, the messaging client operative to initiate a media download network connection using the selected first media endpoint entry, the media download network connection initiated in response to the messaging client foregrounding that was based on the media message notification.

4. The method of claim 3, the media download network connection comprising an end-to-end encrypted network connection, wherein the media message is encrypted end-to-end during transport from a sender client device to the recipient client device.

5. The method of claim 1, the media endpoint list sent to the recipient client device in response to a messaging client on the recipient client device engaging a media capture mode to capture an image or to capture audio using the recipient client device.

6. The method of claim 1, the media endpoint list sent to the recipient client device in response to a messaging client on the recipient client device receiving input selecting a media forwarding interface to forward an image or audio using the recipient client device.

7. The method of claim 1, the plurality of media endpoint entries of the media endpoint list ranked based on a relative priority of the corresponding intermediary device, wherein each media endpoint entry comprises an Internet Protocol address and a domain name address for the corresponding intermediary device.

8. An apparatus, comprising:
a processor; and
a memory storing instructions which when executed by the processor cause the processor to:
receive a media message addressed to a recipient account, the media message comprising a hash of a media item stored in a media repository, the hash distinct from location information indicating at least one storage location of the media item;
send the media message to a recipient client device associated with the recipient account;
generate a media endpoint list comprising a plurality of media endpoint entries, each media endpoint entry corresponding to a respective intermediary device of a plurality of intermediary devices between the media repository and the recipient client device; and
send the media endpoint list to the recipient client device, the media endpoint list to cause the recipient client device to:
select a first media endpoint entry of the plurality of media endpoint entries;
send, based on the selection of the first media endpoint entry, the hash of the media item to the intermediary device corresponding to the first media endpoint entry; and
retrieve, based on sending the hash, the media item from the media repository via the intermediary device corresponding to the first media endpoint entry.

9. The apparatus of claim 8, each media endpoint entry based on a proximity of the corresponding intermediary device and the recipient client device, the media message received from a sender client device, the media endpoint list generated based on a network address of the recipient client device, the hash uniquely identifying the media item in the media repository.

10. The apparatus of claim 8, the media endpoint list sent to the recipient client device in response to a messaging client foregrounding, wherein the messaging client foregrounding is based on a media message notification for the media message being activated on the recipient client device, the messaging client operative to initiate a media download network connection using the selected first media endpoint, the media download network connection initiated in response to the messaging client foregrounding that was based on the media message notification.

11. The apparatus of claim 10, the media download network connection comprising an end-to-end encrypted network connection, wherein the media message is encrypted end-to-end during transport from a sender client device to the recipient client device.

12. The apparatus of claim 8, the media endpoint list sent to the recipient client device in response to a messaging client on the recipient client device engaging a media capture mode to capture an image or to capture audio using the recipient client device.

13. The apparatus of claim 8, the media endpoint list sent to the recipient client device in response to a messaging client on the recipient client device receiving input selecting a media forwarding interface to capture an image or to capture audio using the recipient client device.

14. The apparatus of claim 8, the plurality of media endpoint entries of the media endpoint list ranked based on a relative priority of the corresponding intermediary device, wherein each media endpoint entry comprises an Internet Protocol address and a domain name address for the corresponding intermediary device.

15. At least one non-transitory computer-readable storage medium comprising instructions that, when executed, cause a system to:
   receive a media message addressed to a recipient account, the media message comprising a hash of a media item stored in a media repository, the hash distinct from location information indicating at least one storage location of the media item;
   send the media message to a recipient client device associated with the recipient account;
   generate a media endpoint list comprising a plurality of media endpoint entries, each media endpoint entry corresponding to a respective intermediary device of a plurality of intermediary devices between the media repository and the recipient client device; and
   send the media endpoint list to the recipient client device, the media endpoint list to cause the recipient client device to:
      select a first media endpoint entry of the plurality of media endpoint entries;
      send, based on the selection of the first media endpoint entry, the hash of the media item to the intermediary device corresponding to the first media endpoint entry; and
      retrieve, based on sending the hash, the media item from the media repository via the intermediary device corresponding to the first media endpoint entry.

16. The computer-readable storage medium of claim 15, each media endpoint entry based on a proximity of the corresponding intermediary device and the recipient client device, the media message received from a sender client device, the media endpoint list generated based on a network address of the recipient client device, the hash uniquely identifying the media item in the media repository.

17. The computer-readable storage medium of claim 15, the media endpoint list sent to the recipient client device in response to a messaging client foregrounding, wherein the messaging client foregrounding is based on a media message notification for the media message being activated on the recipient client device, the messaging client operative to initiate a media download network connection using the selected first media endpoint, the media download network connection initiated in response to the messaging client foregrounding that was based on the media message notification.

18. The computer-readable storage medium of claim 17, the media download network connection comprising an end-to-end encrypted network connection, wherein the media message is encrypted end-to-end during transport from a sender client device to the recipient client device.

19. The computer-readable storage medium of claim 15, the media endpoint list sent to the recipient client device in response to a messaging client on the recipient client device engaging a media capture mode to capture an image or to capture audio using the recipient client device.

20. The computer-readable storage medium of claim 15, the plurality of media endpoint entries of the media endpoint list ranked based on a relative priority of the corresponding intermediary device, wherein each storage location of each media endpoint entry comprises an Internet Protocol address and a domain name address for the corresponding intermediary device.

* * * * *